United States Patent
Ciacelli et al.

(10) Patent No.: US 6,236,727 B1
(45) Date of Patent: *May 22, 2001

(54) APPARATUS, METHOD AND COMPUTER PROGRAM PRODUCT FOR PROTECTING COPYRIGHT DATA WITHIN A COMPUTER SYSTEM

(75) Inventors: Mark Louis Ciacelli, Endicott; John William Urda, Endwell; Wai Man Lam, Mohegan Lake; Jack Lawrence Kouloheris, Ossining; John Edward Fetkovich, Endicott, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/881,139

(22) Filed: Jun. 24, 1997

(51) Int. Cl.[7] .................................................. H04N 7/167
(52) U.S. Cl. ..................................... 380/5; 280/3; 280/10; 369/84
(58) Field of Search ................................. 380/3, 4, 49, 5, 380/10; 369/84

(56) References Cited

U.S. PATENT DOCUMENTS

| | | |
|---|---|---|
| 5,029,207 | 7/1991 | Gammie . |
| 5,138,659 | 8/1992 | Kelkar et al. . |
| 5,177,786 | 1/1993 | Kang . |
| 5,426,699 | 6/1995 | Wunderlich et al. . |
| 5,442,701 | 8/1995 | Guillou et al. . |
| 5,521,978 | 5/1996 | Oguro . |
| 5,535,275 | 7/1996 | Sugisaki et al. . |
| 5,574,787 | 11/1996 | Ryan . |
| 5,600,721 | * 2/1997 | Kitazato ................................ 380/20 |
| 5,867,579 | * 2/1999 | Saito ..................................... 380/25 |
| 5,910,987 | * 6/1999 | Ginter et al. ........................... 380/24 |

FOREIGN PATENT DOCUMENTS

| | | | |
|---|---|---|---|
| 1-246979 | 3/1988 | (JP) | ................. H04N/7/16 |
| 8-125651 | 10/1994 | (JP) | ................. H04L/9/00 |
| 58-186843 | 11/1995 | (JP) | ................. H04L/9/12 |
| 9-149022 | 11/1995 | (JP) | ................. H04L/9/12 |

OTHER PUBLICATIONS

Citied Art 3. Pupa 9–149022 and Pupa 58–186843 show encription Copyroght Data.

"Sonic DVD Creator—Blueprint for DVD Premastering", Sonic Solutions, Apr. 1996, (pp. 2–10).

* cited by examiner

Primary Examiner—Tod R. Swann
Assistant Examiner—Todd Jack
(74) Attorney, Agent, or Firm—Heslin & Rothenberg, P.C.; William H. Steinberg

(57) ABSTRACT

Apparatus, method and computer program product are provided for digitally processing an encrypted data stream scrambled, for example, according to content scrambling system (CSS) technology. This digital processing insures against communication of clear data within the computer system from a central processing unit (CPU) to any accessible structure, such as memory or a system bus. Descrambling of the (CSS) scrambled data stream occurs within a module executing on the CPU, which is followed by reencryption of the data prior to transfer from the CPU. By so processing the data, integrity of copyrighted material is maintained, while allowing for software descrambling of the CSS encrypted data stream. Various techniques for establishing the encryption/decryption algorithm pair employed are described. Decryption of the re-encrypted data can occur at a receiving software module and/or a receiving hardware device, such as a decoder.

41 Claims, 4 Drawing Sheets

APPARATUS, METHOD AND COMPUTER PROGRAM PRODUCT FOR PROTECTING COPYRIGHT DATA WITHIN A COMPUTER SYSTEM

TECHNICAL FIELD

The present invention relates in general to apparatus and method for protecting digital video/audio data and, more particularly, to an apparatus, method and computer program product for encryption/decryption of data within a computer system for communication from a CPU to an accessible internal structure, such as memory or a bus, without exposing the data in unscrambled form at the accessible structure.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand, video conferencing, and digital video disc (DVD) motion pictures, an enormous amount of bandwidth is required. In fact, bandwidth is often the main inhibitor in the effectiveness of such systems.

In order to overcome the constraints imposed by existing technology, compression systems have emerged. These systems reduce the amount of video and audio data which must be transmitted by removing redundancy in the picture sequence. At the receiving end, the picture sequence is uncompressed and may be displayed in real time.

One example of an emerging video compression standard is the Moving Picture Experts Group ("MPEG") standard. Within the MPEG standard, video compression is defined both within a picture and between pictures. Video compression within a picture is accomplished by conversion of the digital image from the time domain to the frequency domain by a discrete cosine transform, quantization, variable length coding, and Huffman coding. Video compression between pictures is accomplished via a process referred to as "motion estimation", in which a motion vector plus difference data is used to describe the translation of a set of picture elements from one picture to another. The ISO MPEG2 standard specifies only the syntax of bitstream and semantics of the decoding process. The particular choice of coding parameters and tradeoffs in performance versus complexity is left to the system developers.

Digital Versatile Disc (DVD) is an emerging technology which due to its nature, requires extensive encryption in order to protect the data, such as a motion picture, against unauthorized copying.

DVD is a specification for the content of video, audio and other compressed data to be used as playback video, audio and, for example, subtitle data by a DVD decoder. The DVD video data is specified in the Moving Picture Experts Group (MPEG) standard (ISO/IEC 13818-2). As well as being represented by this standard, the data is also encrypted using the industry's Content Scrambling System (CSS), which produces an encrypted, encoded data stream for DVD playback. The data stream can be decrypted by hardware licensed to perform CSS decryption. Conventionally, CSS decryption occurs at a PCI card, which also conventionally includes MPEG decompression of the encrypted, encoded data signal.

The present invention is directed in one particular aspect to improving upon this conventional DVD processing of the encrypted, encoded data stream.

DISCLOSURE OF THE INVENTION

Briefly summarized, this invention comprises in a first aspect apparatus for processing a scrambled data stream within a computer system having a central processing unit (CPU) coupled to receive the scrambled data stream. The apparatus includes a descrambling means within the central processing unit to descramble the received, scrambled data stream and thereby produce a clear data stream. Re-encryption means also within the central processing unit reencrypts the clear data stream to produce an encrypted data stream, wherein the scrambled data stream is produced from a different encryption algorithm than the encrypted data stream. Means are provided for transferring the encrypted data stream from the central processing unit to a second structure of the computer system, the second structure being coupled to the CPU. Decryption means coupled to the second structure receives the encrypted data stream for decrypting and produces the clear data stream therefrom, wherein the clear data stream is unexposed when transferred from the central processing unit to the second structure coupled to the CPU, while the descrambling means within the central processing unit accomplishes software descrambling of the received, scrambled data stream.

In another aspect, apparatus is provided for processing a data stream within a computer system having a central processing unit coupled to receive the data stream. The apparatus includes encryption means within the CPU for encrypting identified copyright data within the data stream to produce therefrom encrypted data. Means are provided for transferring the encrypted data from the central processing unit to a structure of the computer system coupled thereto, wherein the copyright data is only transferred from the CPU as said encrypted data. Decryption means are coupled to the structure receiving the encrypted data for decrypting the encrypted data.

Various enhancements to each of the aspects summarized above are also described and claimed. In addition, corresponding methods and computer program products are presented and claimed.

To restate, in accordance with this invention clear data, whether compressed or uncompressed, is not allowed to be resident in an accessible computer system structure, such as a host memory buffer or system bus to prevent theft of the clear data. The invention is particularly applicable to MPEG encoded and CSS encrypted video data such as employed by digital video disc (DVD) technology. The decryption techniques presented herein allow for subsequent changes, for example, through the flexibility of downloading new microcode, of an encryption/decryption algorithm pair. In addition, the particular scrambling/descrambling algorithm employed may vary. The concept is to initiate the descrambling process by host software, rescramble the data at the central processing unit using a different encryption technique, and then complete the descrambling at the receiving module, whether the receiving module comprises an additional software module executing on the central processing unit or a receiving hardware device, such as a decoder resident on a system bus coupled to the central processing unit. The rescrambling subsequent to primary software descrambling of the received encrypted data may be complete or partial. At the receiving module, the rescrambled data can be decrypted for display, output via an audio card, or undergo further processing.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, the present invention comprises an apparatus, method and computer program product for processing a data stream scrambled, for example, by employing content scrambling system (CSS) technology. As one aspect, the invention comprises descrambling a received CSS encrypted signal at a central processing unit without subsequently exposing a clear copy of the descrambled data in any accessible structure outside the CPU, such as memory or a system bus. This insures that information to be protected, such as security data or copyrighted material (herein collectively referred to as "copyright data"), will not be exposed at a point where illegal copying of the original data stream is feasible (e.g., during data transfer) while still allowing software descrambling of the CSS encrypted stream. In a specific example discussed herein, the encrypted stream might also comprise an encoded stream of video/audio data compressed employing the Moving Picture Experts Group (MPEG) standard (IOS/IEC 13818-2).

In accordance with the present invention, a primary software module within a central processing unit conducts CSS descrambling and then encrypts the data stream using a selected encryption/decryption algorithm before sending any copyright data to a software module and/or hardware device outside the CPU, for example, through memory or a system bus. The external software module and/or hardware device receiving the re-encrypted data stream then decrypts the stream and processes it, e.g., for display in the case of video data or output to an audio card in the case of audio data.

Briefly summarized, the processing involved herein includes determining at the primary software module whether data needs to be protected during subsequent transmission from the computer system's CPU. If "yes", then the primary module communicates to the software module and/or hardware device ultimately to receive the stream of data to establish an encryption/decryption algorithm pair. This communication may involve downloading the decryption algorithm into the receiving software module and/or hardware device or signaling the decrypting software/hardware which decryption algorithm from a plurality of predefined encryption/decryption algorithm pairs is to be used. The primary module uses the selected encryption algorithm to re-encrypt the descrambled data for transfer through any accessible structure, such as memory and/or system buses, to the receiving software module and/or hardware device which is to accomplish the final decryption. The receiving module, which may also be located within the central processing unit, then decrypts the data and performs conventional processing thereon. As an alternative example, the re-encrypted data from the central processing unit may be sent through system memory and/or a system bus to a video decoder for descrambling and then decoding of the data, e.g., for display.

Figure 1:
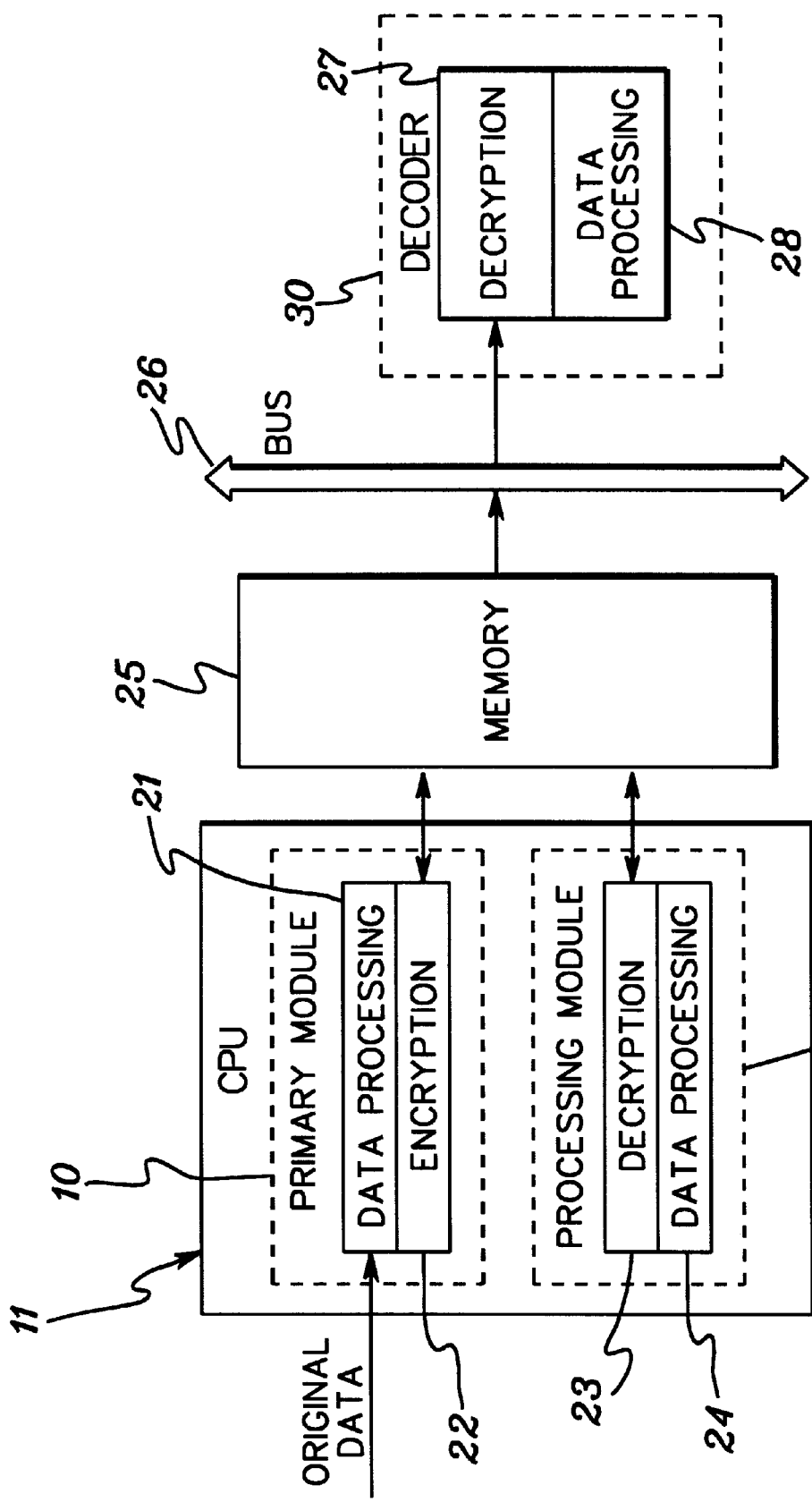
FIG. 1 depicts one embodiment of a computer system employing encryption/decryption apparatus in accordance with the present invention.

FIG. 1 depicts one embodiment of a computer system to employ apparatus in accordance with the present invention. A primary software module 10 and a secondary (or receiving) processing software module 20 are each executed within the computer system's central processing unit (CPU). A processing unit hardware device 30 (such as a decoder) resides on one of the buses 26 of the computer system. Communication between primary software module 10 and software module 20 and/or processing hardware 30 requires data transfer through memory 25 and/or system bus 26, both located outside the CPU 11. Software module 10 contains a data processing module 21 and an encryption module 22. Data processing module 21 comprises any conventional processing to be done to the data stream, and in accordance with the present invention, also includes descrambling (such as CSS descrambling) of a received encrypted, original data stream. Processing module 20 contains a decryption module 23 and a processing module 24, while processing hardware device 30 includes a decryption device 27 and a data processing device 28.

Original data arrives at the central processing unit 11, for example, from an external storage device or from a computer system network. This data may contain a portion which needs to be protected from illegal copying. This portion is denoted "copyright data" herein to distinguish it from the original data. If the entire original data needs to be protected, then the copyright data is equivalent to the original data. The original data is first transferred to the input of module 10 for processing by data processing 21. Again, for example, this may include descrambling of CSS encrypted original data. The identified copyright data is then re-encrypted by encryption module 22 using a different encryption algorithm, i.e., an encryption algorithm other than CSS encryption. The original data passing through module 10 can comprise an unencrypted data stream or an encrypted data stream. In the first case, processing module 21 processes the original data and encryption module 22 performs an encryption algorithm to encrypt any copyright data. By way of example, the encryption algorithm could be of the type described in B. Schneier, *Applied Cryptography*, John Wiley & Sons Inc., 2nd Ed. (1996).

In the second case, processing module 21 can decrypt the original data, after which encryption module 22 would re-encrypt the copyright portion of it using a selected encryption algorithm, which again can be of the type described in *Applied Cryptography*. This procedure is called trans-encryption. Alternatively processing module 21 can choose not to ecrypt the original data and module 22 could then encrypt on top of the originally encrypted copyright data. This procedure is referred to as layerencryption. Advantageously, trans-encryption allows the encryption algorithm employed within the computer system in accordance with this invention to be different from that employed by the original data, e.g., CSS encryption. Layer-encryption allows multiple encryption algorithms to be employed, thereby enhancing security.

The encrypted copyright data can be transferred to/through system memory 25 and/or system bus 26 for ultimate receipt by secondary processing module 20 and/or processing hardware device 30. As noted above, module 20 has a decryption module 23 and a data processing module 24, while hardware device 30 contains a decryption device 27 and a data processing device 28. Decryption module 23 and/or device 27 decrypts the data encrypted by encryption module 22. The decrypted data is then processed by the data processing module 24 and/or data processing device 28, respectively.

The encryption/decryption algorithm pair employed by encryption module 22 and decryption module 23 (and/or device 27) can be a default algorithm pair predefined in the design stage of modules 10 & 20 and/or hardware device 30.

Alternatively, the algorithm pair can be a downloadable algorithm.

For example, there can be multiple encryption algorithms built into encryption module 22 and multiple decryption modules built into decryption module 23 and/or decryption device 27. Only one matched pair will be used at any given time. Before encryption, the encryption module 22 sends a signal to module 23 and/or device 27 to notice them which particular algorithm module 22 will employ. This signal can be in the form of a software parameter, or a software or a hardware interrupt. The decryption module 23 and/or decryption device 27 then employs the corresponding decryption algorithm of the selected encryption/decryption algorithm pair. Since no actual algorithm content is passed between the modules and devices, the actual encryption algorithm employed will not be known unless reverse engineering is performed within the software modules and/or the hardware devices.

Alternatively, encryption module 22 and decryption module 23 (or decryption device 27) can be predefined at the design stage to include a resident encryption/decryption routine. Before encryption, module 22 would decide on an actual encryption and decryption algorithm pair to be used. Module 22 would use the resident encryption algorithm to encrypt the actual decryption routine of the selected algorithm pair to be used by the decryption module 23 and/or decryption device 27. The encryption module 22 then transmits the encrypted version of the actual decryption algorithm to module 23 and/or device 27.

Upon receipt of this information, the decryption module 23 and/or device 27 employs the resident decryption algorithm to decrypt the downloaded algorithm. Module 23 then uses the descrambled decryption algorithm as a procedure call, while device 27 could load the algorithm into a programmable circuit within device 27. After completing downloading of the actual decryption algorithm, module 22 uses the actual encryption algorithm to encrypt the data, and module 23 and/or device 27 employs the downloaded decryption routine to decrypt the data. If an update of the encryption/decryption routine is desired, then a different encryption/decryption algorithm pair is selected and encryption module 22 downloads the corresponding decryption algorithm into the decryption module 23 and/or decryption device 27.

After decryption is performed, the receiving data processing module 24 and/or device 28 performs any required data processing, such as MPEG decoding of a clear, compressed video/audio data signal.

Figure 2:
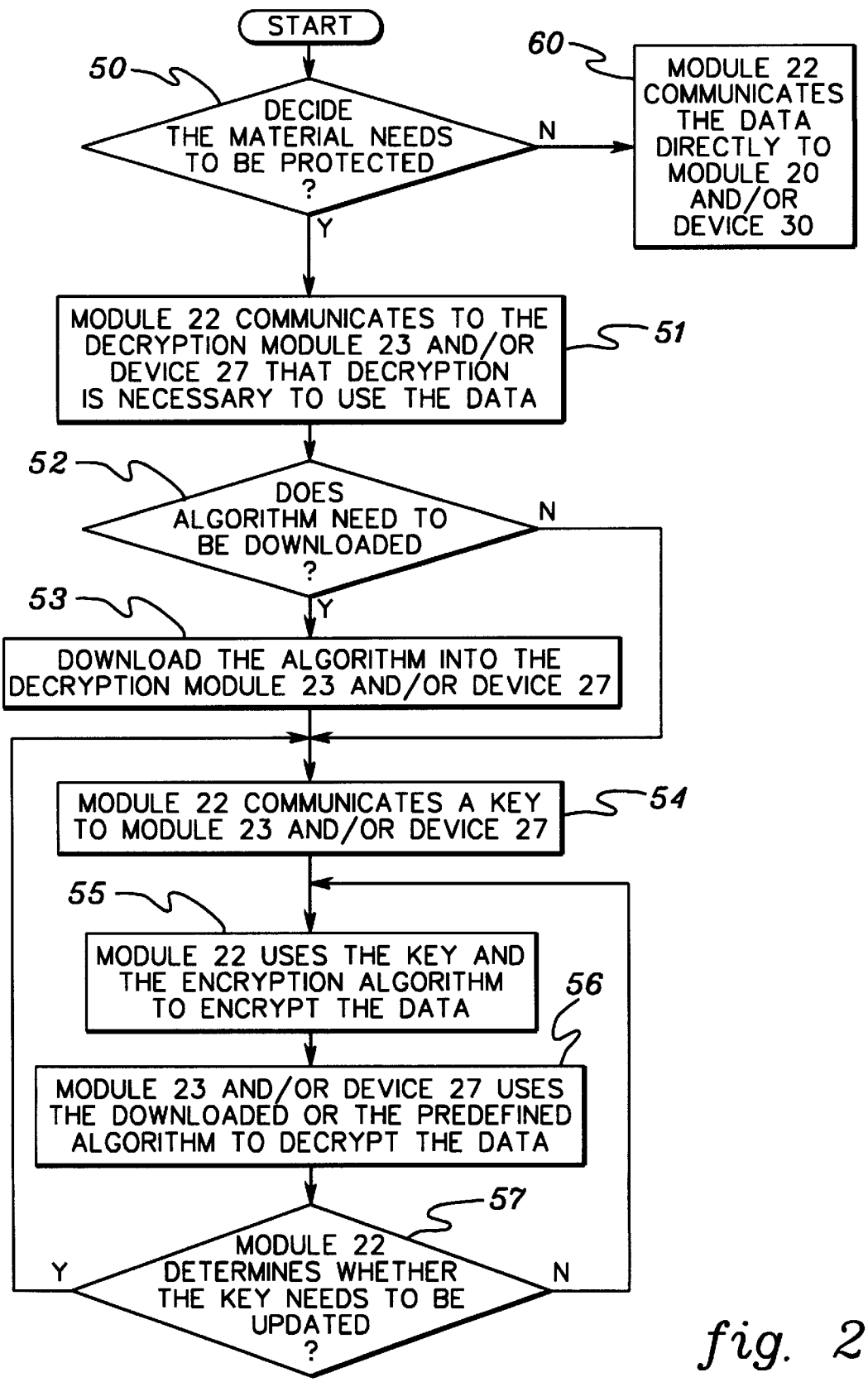
FIG. 2 is a flowchart of one embodiment for accomplishing encryption/decryption processing in accordance with the present invention.

FIG. 2 depicts a flowchart of one embodiment of processing to establish encryption and decryption procedures to secure the data in accordance with the present invention using the apparatus of FIG. 1. This processing flow is started when original data enters the input of software module 10 (FIG. 1). Module 10 initially determines whether the received data needs to be protected 50. If "no", then module 22 communicates the data directly to secondary module 20 and/or device 30 at step 60. For example, in a DVD application, module 10 can examine the Copy Generation Management System (CGMS) data. If the received data needs to be protected, then at step 51 processing communicates from module 22 to decryption 23 and/or decryption device 27 that decryption is needed prior to use of the data.

Next, processing determines whether a decryption algorithm needs to be downloaded (step 52). If "no", meaning that a default decryption algorithm is to be used, processing proceeds directly to step 54. Otherwise, the algorithm is downloaded into decryption module 23 and/or decryption device 27 at step 53.

After establishing the decryption algorithm, encryption module 22 communicates a key to decryption module 23 and/or decryption device 27 (step 54), and uses the key and the encryption algorithm to encrypt the copyright data (step 55). The encrypted key and encrypted data can be sent as a single bitstream, or separately, to module 23 and/or device 27 by way of system memory and/or a system bus. At step 56, the decryption module 23 and/or decryption device 27 uses the chosen or the downloaded algorithm to decrypt the data. Module 22 then determines whether the encryption key should be updated 57. If "no", the encryption and decryption processing steps 55 & 56 are repeated. If desired, the same encryption key can be used until the end of the data stream transmission. Otherwise, return is made to step 54 for communication of a new encryption key to module 23 and/or device 27.

Figure 3:
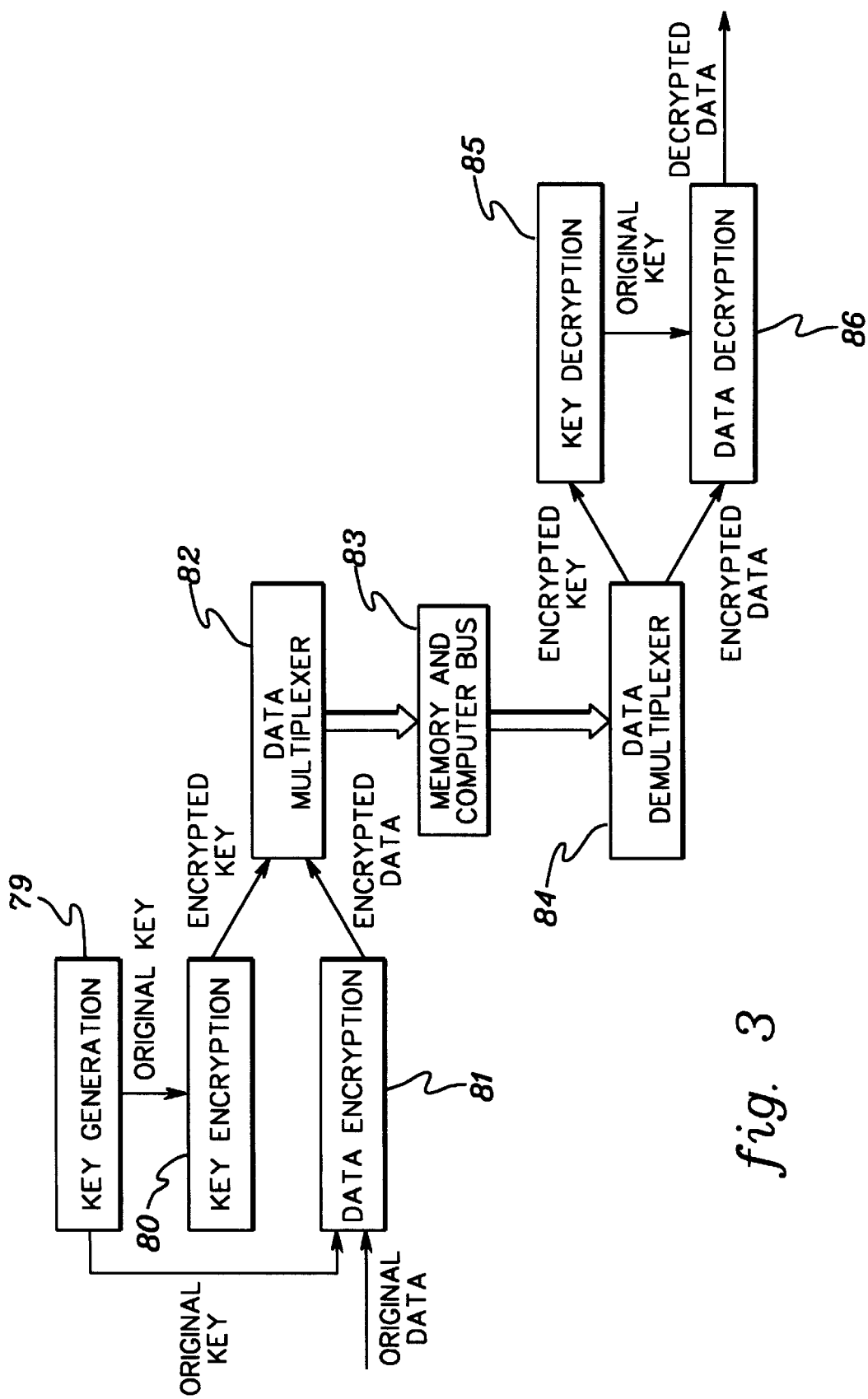
FIG. 3 is a block diagram of one embodiment for updating keys within the encryption and decryption modules and/or devices of an apparatus in accordance with the present invention.

FIG. 3 depicts one embodiment of apparatus/processing for updating encryption keys pursuant to steps 54 through 57 of FIG. 2. Within module 22 there is a key generation module 79, a key module 80, a data encryption module 81 and a data multiplexer module 82. Key generation module 79 generates an original key which is encrypted by module 80 and also used by module 81 to encrypt the original data. Data multiplexer 82 combines the encrypted key and the encrypted data into one data stream, which is then transmitted through memory and/or system bus 83 to the decryption module 23 and/or decryption device 27. The decryption module 23 and decryption device 27 contains a data demultiplexer module/device 84, a key decryption module/device 85 and a data decryption module/device 86. The data demultiplexer module/device 84 decouples the received data stream into the encrypted data and the encrypted key. The key is then decrypted by key decryption module/device 85 to produce the original key. Data decryption module 86 uses the original key to decrypt the encrypted data.

Figure 4:
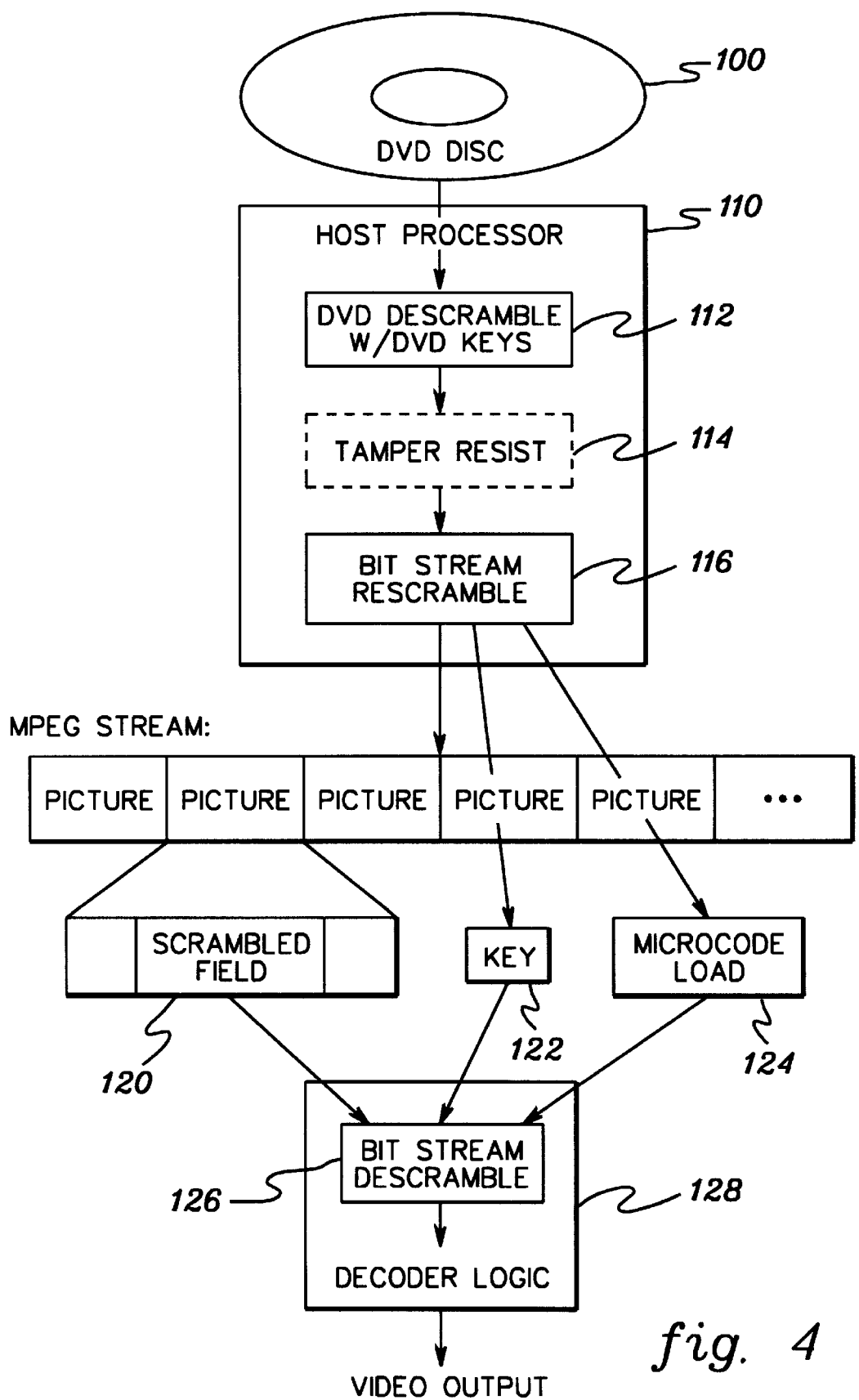
FIG. 4 is a representation of one embodiment of DVD disc data stream processing using microcode in accordance with the present invention.

FIG. 4 depicts a further embodiment of processing in accordance with the present invention. In this embodiment, rescrambling of the data stream is employed after CSS decryption, along with subsequent descrambling of the re-encrypted stream prior to decompression decoding in a decoder chip. The processings described are preferably accomplished within on-chip microcode.

More particularly, a bit stream is read from a DVD disc 100 into a host processor 110 where a central processing unit conducts DVD descrambling using licensed DVD keys 112. An optional tamper resistance algorithm 114 can be employed to protect the subsequent encryption process. The clear, bit stream is then rescrambled 116 using any available encrypting/decrypting algorithm, i.e., other than CSS encoding. This rescrambled data is delivered to the decoder, for example, an MPEG video decoder 128. Descrambling occurs within decoder 128 subsequent to a microcode load 124 containing the corresponding bit stream descrambling microcode. The exact portions of the stream which are scrambled and then descrambled, as well as the algorithm used, may vary from release to release of the code. The data stream may comprise an MPEG video data stream 118 wherein in one embodiment one or more fields of each picture 120 are scrambled in accordance with bit stream rescramble 116 processing such that the data stream is at least partially re-encrypted subsequent to the DVD descrambling processing 112. A decryption key 122 as well as the microcode load 124 are sent along with the video data stream to bit stream descramble logic 126 within the video decoder 128.

Those skilled in the art will note from the above discussion that in accordance with this invention, clear data (uncompressed or compressed) is never resident in an accessible computer system structure, such as a host memory buffer or system bus, thereby inhibiting theft of the clear data. The invention is particularly applicable to MPEG encoded and CSS encrypted video data such as employed by digital video disc technology. The decryption techniques presented herein allow for subsequent changes, e.g., through the flexibility of new microcode loads, of a decryption algorithm which may have been broken. In addition, the particular scrambling/descrambling algorithm employed by the technique of the present invention may vary. The concept is to begin the descrambling process by host software, rescramble the data at the CPU using a different encryption technique, and then complete the descrambling at the receiving module, whether the receiving module comprises an additional software module or a receiving hardware device, such as a decoder. The rescrambling subsequent to primary software descrambling of the received encrypted data may be complete or partial. For example, in one embodiment, certain MPEG data can be scrambled by the host software. The host would then transmit the appropriate descrambling microcode loads or a single microcode load with an appropriate key or keys to the receiving module or receiving hardware device. At the receive module, the microcode performs the inverse of the scrambling algorithm used by the host. The key may be static or accumulated.

Further, those skilled in the art will note that the present invention can be included in an article of manufacture (e.g., one or more computer program products) having, for instance, computer useable media. The media has embodied therein, for instance, computer readable program code means for providing and facilitating the capabilities of the present invention. The articles manufactured can be included as part of the computer system or sold separately.

The flow diagrams depicted herein are provided by way of example. There may be many variations to these diagrams or the steps or operations described herein without departing from the spirit of the invention. For instance, in certain cases the steps be performed in differing order, or steps may be added, deleted or modified. Further, although described principally herein with reference to a single primary module, a single receiving processing module, and a single processing hardware device, multiple modules and devices of each type may be employed as apparatus in accordance with the present invention. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. Apparatus for processing a scrambled data stream within a computer system having a central processing unit (CPU) coupled to receive the scrambled data stream, comprising:

descrambling means within the central processing unit for descrambling the received, scrambled data stream to produce a clear data stream;

re-encryption means within the central processing unit for re-encrypting the clear data stream to produce an encrypted data stream, wherein said scrambled data stream is produced from a different encryption algorithm than said encrypted data stream;

means for transferring the encrypted data stream from the central processing unit to a second structure of the computer system, said second structure being coupled to the CPU; and decryption means coupled to the second structure for receiving the encrypted data stream therefrom and for decrypting the encrypted data stream to produce said clear data stream, wherein said clear data stream is unexposed when transferred from the central processing unit to said second structure coupled to the CPU, while said descrambling means within the central processing unit accomplishes descrambling of the received scrambled data stream.

2. The apparatus of claim 1, wherein said scrambled data stream comprises a scrambled, encoded data stream and wherein said apparatus further comprises a decoder coupled to said decryption means for decoding a clear, encoded data stream produced by said decryption means.

3. The apparatus of claim 2, wherein said clear, encoded data stream comprises a video data stream and wherein said decoder comprises an MPEG video decoder.

4. The apparatus of claim 2, wherein said scrambled, encoded data stream comprises a CSS scrambled, MPEG encoded data stream, and wherein said descrambling means comprises means for CSS descrambling the scrambled, encoded data stream within the CPU and said decoder comprises means for MPEG decoding said clear, encoded data stream.

5. The apparatus of claim 2, wherein said decoder comprises a decoding hardware device and said decryption means resides within said decoding hardware device.

6. The apparatus of claim 1, wherein said reencryption means further comprises means for providing a key for use in re-encrypting the clear data stream, and wherein said decryption means includes means for employing the key in decrypting the encrypted data stream.

7. The apparatus of claim 6, wherein said reencryption means further comprises means for encrypting said key to produce an encrypted key, and for multiplexing the encrypted key and the encrypted data stream into a multiplexed data stream for transfer to said second structure coupled to the CPU, and wherein said decryption means further comprises means for demultiplexing said multiplexed data stream to obtain said encrypted key and said encrypted data stream, and wherein said decryption means further comprises means for decrypting said encrypted key.

8. The apparatus of claim 1, further comprising means for selecting an encryption/decryption algorithm pair for use by said re-encryption means and said decryption means.

9. The apparatus of claim 8, wherein said means for selecting comprises means for downloading a decryption algorithm of said selected encryption/decryption algorithm pair from said reencryption means to said decryption means, said means for downloading including means for encrypting the decryption algorithm for transfer between the reencryption means and the decryption means.

10. The apparatus of claim 8, wherein said means for selecting comprises means for selecting said encryption/decryption algorithm pair from a plurality of encryption/decryption algorithm pairs at said re-encryption means and said decryption means, and wherein said means for selecting comprises means for noticing the decryption means which decryption algorithm of said plurality of encryption/decryption algorithm pairs corresponds with an encryption algorithm employed by said re-encryption means.

11. The apparatus of claim 1, wherein said decryption means comprises a decryption module disposed within the central processing unit, and said second structure coupled to the CPU comprises memory.

12. Apparatus for processing a data stream within a computer system having a central processing unit (CPU) coupled to receive the data stream, said apparatus comprising:
  encryption means within the CPU for encrypting identified copyright data within the data stream to produce therefrom encrypted data;
  means for transferring the encrypted data from the central processing unit to a structure of the computer system coupled thereto, wherein said copyright data is only transferred from the central processing unit as said encrypted data; and
  decryption means coupled to said structure receiving the encrypted data, said decryption means comprising means for decrypting the encrypted data.

13. The apparatus of claim 12, further comprising means for identifying within the central processing unit said copyright data of the data stream, said means for identifying providing said identified copyright data to said encryption means.

14. The apparatus of claim 13, wherein the data stream comprises a scrambled, encoded data stream, and wherein said apparatus further comprises descrambling means for descrambling the scrambled, encoded data stream within the central processing unit to produce a clear, encoded data stream, and wherein said means for identifying comprises means for examining the clear, encoded data stream to identify copyright data for encryption by said encryption means.

15. The apparatus of claim 12, wherein said decryption means comprises a microcode decryption device.

16. The apparatus of claim 12, wherein said data stream comprises a scrambled data stream, and wherein said apparatus further comprises means for descrambling the scrambled data stream prior to said encrypting of the identified copyright data by said encryption means, wherein said scrambled data stream is produced from a different encryption algorithm than said encrypted data produced by said encryption means.

17. The apparatus of claim 12, wherein said encryption means further comprises means for providing a key for use in said encrypting of the identified copyright data and for use by said decryption means for decrypting the encrypted data.

18. The apparatus of claim 17, wherein said encryption means further comprises means for encrypting said key to produce an encrypted key, and for multiplexing the encrypted key and the encrypted data into a multiplexed data stream for transfer to said structure coupled to the CPU, and wherein said decryption means further comprises means for demultiplexing said multiplexed data stream to obtain said encrypted key and said encrypted data, and wherein said decryption means further comprises means for decrypting said encrypted key.

19. The apparatus of claim 12, further comprising means for selecting an encryption/decryption algorithm pair for use by said encryption means and said decryption means from a plurality of predefined encryption/decryption algorithm pairs, said selected encryption/decryption algorithm pair comprising an encryption algorithm and a corresponding decryption algorithm, said encryption algorithm being employed by said encryption means, and said corresponding decryption algorithm being employed by said decryption means.

20. A method for processing a scrambled data stream within a computer system having a central processing unit and a structure coupled thereto, said method comprising:
  (a) receiving the scrambled data stream at the central processing unit (CPU);
  (b) descrambling the scrambled data stream within a module executing on the central processing unit to produce clear data;
  (c) re-encrypting the clear data within the central processing unit, said re-encrypting producing at least partially encrypted data;
  (d) subsequent to said re-encrypting, transferring the at least partially encrypted data from the central processing unit to a second structure of the computer system, said second structure being coupled to the central processing unit; and
  (e) subsequent to said transferring, retrieving and decrypting the at least partially encrypted data to produce clear data, wherein said clear data is unexposed when transferred from the central processing unit to the structure coupled thereto, while said descrambling occurs within the module executing on the central processing unit, and wherein the scrambled data stream is produced from a different encryption algorithm than employed by said re-encrypting (c) to produce said at least partially encrypted data.

21. The method of claim 20, wherein the scrambled data stream comprises a scrambled, encoded data stream, and wherein said decrypting (e) comprises producing clear, encoded data, and wherein said method further comprises decoding said clear, encoded data to produce said clear data.

22. The method of claim 21, wherein said scrambled, encoded data stream comprises a CSS scrambled, MPEG encoded data stream, and wherein said descrambling (b) comprises CSS descrambling said scrambled, encoded data stream within the CPU, and said decoding comprises MPEG decoding said clear, encoded data to produce said clear data.

23. The method of claim 20, wherein said reencrypting (c) includes employing a key in reencrypting the clear data, and wherein said method further comprises providing said key for said decrypting (e), said decrypting employing said key in decrypting the at least partially encrypted data.

24. The method of claim 23, wherein said reencrypting (c) includes encrypting said key to produce an encrypted key, and multiplexing the encrypted key and the at least partially encrypted data into a multiplexed data stream, and wherein said decrypting (e) further comprises demultiplexing said multiplexed data stream to obtain said encrypted key and said at least partially encrypted data, and said decrypting (e) further comprises decrypting said encrypted key and employing said key in decrypting said at least partially encrypted data.

25. The method of claim 20, further comprising selecting an encryption/decryption algorithm pair for use by said re-encrypting (c) and said decrypting (e), said selecting comprising choosing said selected encryption/decryption algorithm pair from a plurality of predefined encryption/decryption algorithm pairs.

26. The method of claim 25, wherein said reencrypting (c) accomplishes said selecting and said re-encrypting further comprises downloading a decryption algorithm of the selected encryption/decryption algorithm pair for use by said decrypting (e).

27. The method of claim 20, wherein said decrypting (e) comprises decrypting the at least partially encrypted data within the central processing unit, and wherein said structure coupled to the central processing unit comprises a memory structure, said retrieving (e) comprising retrieving said at least partially encrypted data from said memory structure.

28. A method for processing a data stream within a computer system having a central processing unit and a structure outside the central processing unit coupled thereto, said method comprising:
   (a) receiving the data stream at the central processing unit (CPU);
   (b) encrypting identified copyright data within the data stream to produce encrypted data;
   (c) subsequent to said encrypting (b), transferring the encrypted data from the central processing unit to the structure coupled thereto, wherein said copyright data is only transferred from the central processing unit as said encrypted data; and
   (d) retrieving the encrypted data from the structure coupled to the CPU and decrypting the encrypted data to produce clear data, said decrypting occurring after transfer of the encrypted data to the structure outside the central processing unit, wherein said clear data is unexposed within the computer system when transferred between the central processing unit and the structure coupled thereto.

29. The method of claim 28, further comprising identifying within the central processing unit said copyright data of the data stream for use by said encrypting (b).

30. The method of claim 29, wherein said data stream comprises a scrambled data stream, and said method further comprises descrambling the scrambled data stream prior to said identifying of the copyright data, and wherein said scrambled data stream is produced from a different encryption algorithm than employed by said encrypting (b).

31. The method of claim 28, wherein said encrypting (b) includes employing a key in encrypting said identified copyright data and providing said key to said decrypting (d).

32. The method of claim 31, wherein said encrypting (b) further comprises encrypting said key to produce an encrypted key, and multiplexing the encrypted key and the encrypted data into a multiplexed data stream for transfer to said structure coupled to the CPU, and wherein said decrypting (d) further comprises demultiplexing said multiplexed data stream to obtain said encrypted key and said encrypted data, and wherein said decrypting (d) further comprises decrypting said encrypted key for use in decrypting said encrypted data.

33. The method of claim 28, further comprising selecting an encryption/decryption algorithm pair from a plurality of predefined encryption/decryption algorithm pairs, and wherein said encrypting (b) comprises employing an encryption algorithm of said selected encryption/decryption algorithm pair in encrypting said identified copyright data, and said decrypting (d) comprises employing a corresponding decryption algorithm of said selected encryption/decryption algorithm pair for use in decrypting the encrypted data.

34. A computer program producing comprising a computer usable medium having computer readable program code means therein for use in processing a scrambled data stream within a computer system having a central processing unit and a structure coupled thereto, said computer readable program code means in said computer program product comprising:
   computer readable program code means for causing a computer to affect receiving of the scrambled data stream at the central processing unit and for descrambling the scrambled data stream within the central processing unit to produce clear data, and for re-encrypting the clear data within the central processing unit to produce at least partially encrypted data;
   computer readable program code means for causing a computer to affect transferring of said at least partially encrypted data from the central processing unit to the structure coupled thereto; and
   computer readable program code means for causing a computer to affect retrieving of the at least partially encrypted data from the structure coupled to the CPU and for decrypting the at least partially encrypted data, said decrypting producing clear data, wherein said clear data is unexposed when transferred from the central processing unit to the structure coupled thereto, while said descrambling occurs within the central processing unit.

35. The computer readable program code means of claim 34, wherein the scrambled data stream comprises a scrambled, encoded data stream, and wherein said computer readable program code means in said computer program product further comprises computer readable program code means for causing a computer to affect decoding of clear, encoded data produced by said computer readable program code means for decrypting the at least partially encrypted data.

36. The computer readable program code means of claim 35, wherein said scrambled, encoded data stream comprises a CSS scrambled, MPEG encoded data stream and wherein said computer readable code means for descrambling said scrambled, encoded data stream comprises computer readable program code means for causing a computer to affect CSS descrambling of the scrambled, encoded data stream, and wherein said computer readable program code means for decoding comprises computer readable program code means for causing a computer to affect MPEG decoding of said clear, encoded data stream.

37. A computer program product comprising a computer useable medium having computer readable program code means therein for use in processing a data stream within a computer system having a central processing unit and a structure outside the central processing unit coupled thereto, said computer readable program code means in said computer program product comprising:
   computer readable program code means for causing a computer to affect receiving of the data stream at the central processing unit and encrypting of identified copyright data within the data stream to produce encrypted data;
   computer readable program code means for causing a computer to affect transferring of the encrypted data from the central processing unit to the structure outside the central processing unit; and
   computer readable program code means for causing a computer to affect retrieving and decrypting of the encrypted data after transfer to the structure outside the central processing unit, wherein clear data is unexposed within the computer system when transferred between the central processing unit and the structure coupled thereto.

38. The computer readable program code means of claim 37, further comprising computer readable program code means for causing a computer to affect identifying said copyright data of the data stream for encrypting.

39. The computer readable program code means of claim 37, wherein said computer readable program code means for encrypting the identified copyright data includes computer readable program code means for causing a computer to affect said encrypting using a key and for providing said key to said computer readable program code means for decrypting the encrypted data.

40. The computer readable program code means of claim 39, wherein said computer readable program code means for encrypting comprises computer readable program code means for causing a computer to affect encrypting of said key to produce an encrypted key, and for multiplexing the encrypted key and the encrypted data into a multiplexed data stream for transfer to said structure coupled to the CPU, and wherein said computer readable program code means for decrypting comprises computer readable program code means for causing a computer to affect demultiplexing of the multiplexed data stream to obtain said encrypted key and said encrypted data, and for decrypting the encrypted key for use in decrypting the encrypted data.

41. The computer readable program code means of claim 37, further comprising computer readable program code means for causing a computer to affect selecting an encryption/decryption algorithm pair for use in encrypting said identified copyright data and decrypting said encrypted data, said selected encryption/decryption algorithm pair being selected from a plurality of predefined encryption/decryption algorithm pairs, and further comprising computer readable program code means for causing a computer to affect noticing of a corresponding decryption algorithm of the selected encryption/decryption algorithm pair to said computer readable program code means for decrypting the encrypted data.

* * * * *

UNITED STATES PATENT AND TRADEMARK OFFICE
CERTIFICATE OF CORRECTION

PATENT NO. : 6,236,727 B1
DATED : May 22, 2001
INVENTOR(S) : Ciacelli et al.

It is certified that error appears in the above-identified patent and that said Letters Patent is hereby corrected as shown below:

Column 6,
Line 38, insert -- encryption -- after the word "key"
Line 66, insert -- encoded -- before the word "bit"

Column 7,
Line 29, insert -- rescrambling -- before the word "technique"
Line 57, insert -- may -- after the word "steps"

Column 12,
Line 3, delete the word "producing" and insert -- product --

Signed and Sealed this

Second Day of April, 2002

Attest:

Attesting Officer

JAMES E. ROGAN
*Director of the United States Patent and Trademark Office*